Figure 1:
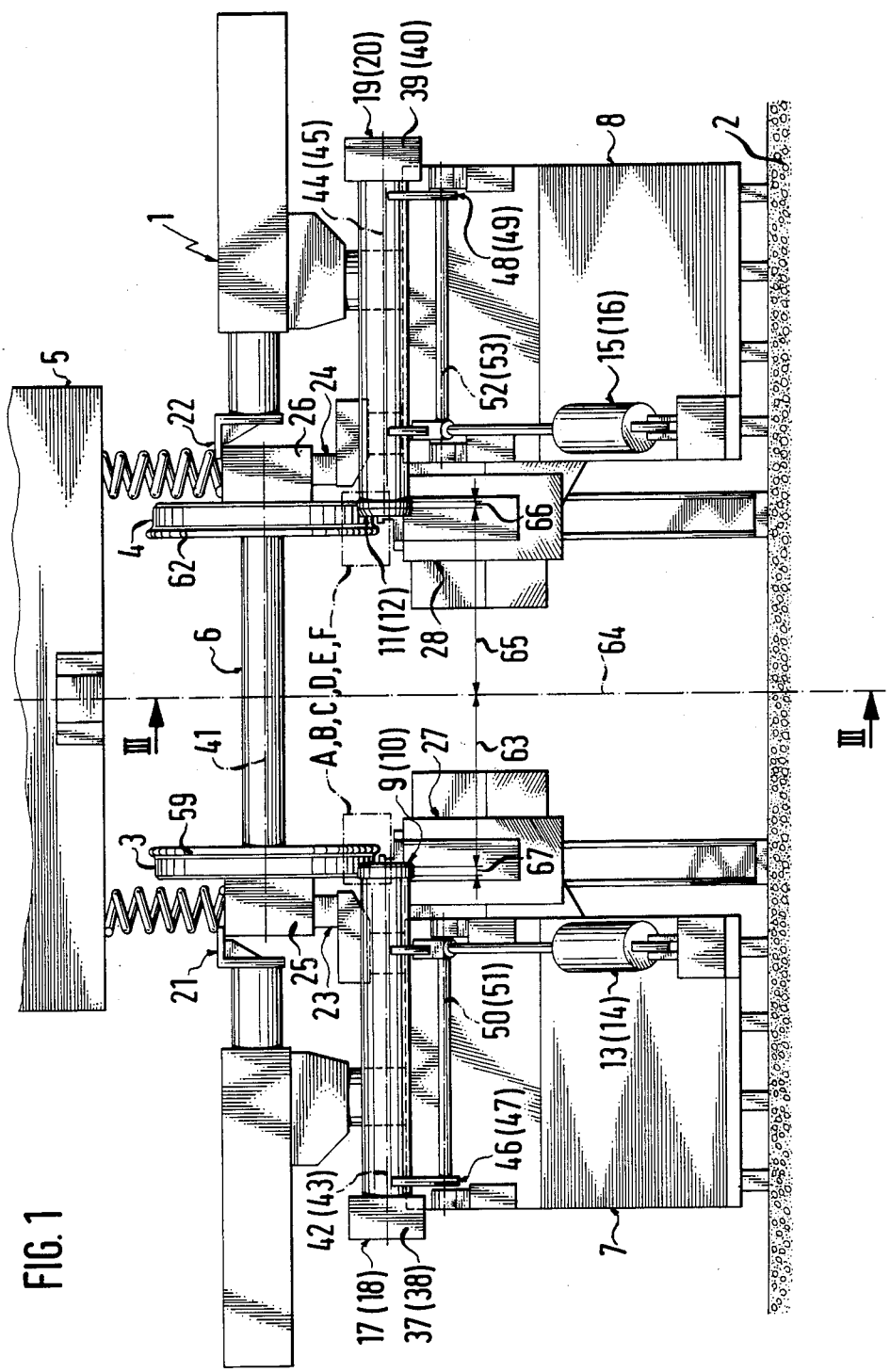

United States Patent [19]

Gutöhrlein et al.

[11] Patent Number: 4,674,369
[45] Date of Patent: Jun. 23, 1987

[54] UNDERFLOOR WHEELSET TURNING MACHINE FOR REPROFILING THE WHEEL TYPE CONTOURS OF RAILWAY WHEELSETS

[75] Inventors: Uwe Gutöhrlein, Dortmund; Jürgen Rosenthal, Werne, both of Fed. Rep. of Germany

[73] Assignee: Hoesch Aktiengesellschaft, Fed. Rep. of Germany

[21] Appl. No.: 807,500

[22] Filed: Dec. 11, 1985

[30] Foreign Application Priority Data

Dec. 22, 1984 [DE] Fed. Rep. of Germany ... 8437708[U]

[51] Int. Cl.⁴ .............................................. B23B 5/32
[52] U.S. Cl. ............................................................ 82/8
[58] Field of Search ................ 82/8, 2 R, 40 R, 38 R, 82/39

[56] References Cited

U.S. PATENT DOCUMENTS

| | | | |
|---|---|---|---|
| 3,323,397 | 6/1967 | Ladoues et al. | 82/8 |
| 3,839,932 | 10/1974 | Dombrowski | 82/8 |
| 4,033,209 | 7/1977 | Dombrowski | 82/8 |

FOREIGN PATENT DOCUMENTS

| | | | |
|---|---|---|---|
| 1124782 | 3/1962 | Fed. Rep. of Germany | 82/8 |
| 2937819 | 3/1981 | Fed. Rep. of Germany | 82/8 |
| 3012996 | 10/1981 | Fed. Rep. of Germany | 82/8 |
| 1005764 | 9/1965 | United Kingdom | 82/8 |

Primary Examiner—Nicholas P. Godici
Assistant Examiner—Jerry Kearns

[57] ABSTRACT

An underfloor wheelset turning machine is described for reprofiling the wheel tire contours (34) of railway wheelsets (6). The machine comprises two turning supports (27, 28) and four driven friction rollers (9, 10, 11, 12), of which each pair of rollers is adapted to be pressed with in each case a peripheral face (57, 58, 60, 61) onto a wheel tire. The friction rollers (9, 10, 11, 12) are pivotal individually each about a pivot axis (50, 51, 52, 53) disposed parallel to the wheelset axle (41). The peripheral faces (60, 61) of two friction rollers (11, 12) are disposed further from the wheelset center (64) compared with the peripheral faces (57, 58) of the other two friction rollers (9, 10).

1 Claim, 9 Drawing Figures

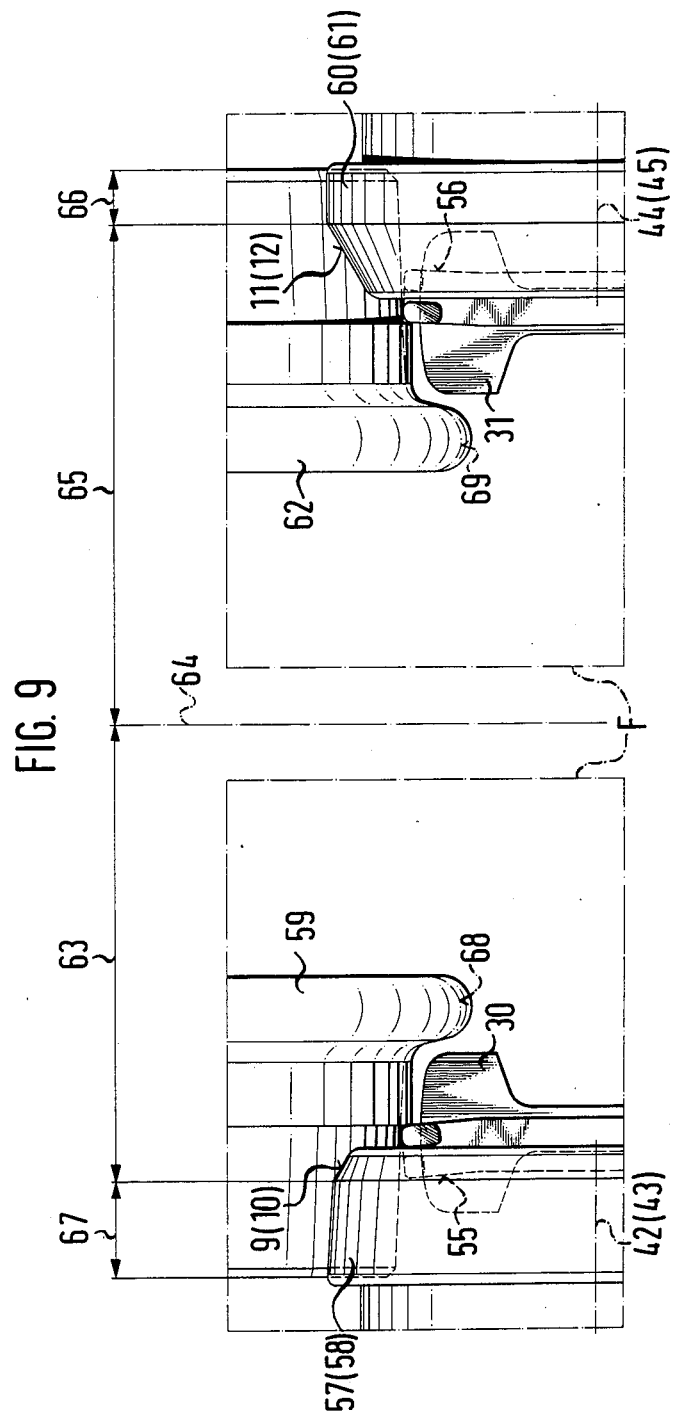

UNDERFLOOR WHEELSET TURNING MACHINE FOR REPROFILING THE WHEEL TYPE CONTOURS OF RAILWAY WHEELSETS

The innovation relates to an underfloor wheelset turning machine for reprofiling the wheel tire contours of railway wheelsets comprising two turning supports and four driven friction rollers, of which each pair of rollers is adapted to be pressed with in each case a peripheral face onto a tire wheel, the friction rollers being pivotal individually each about a pivot axis disposed parallel to the wheelset axle.

An underfloor wheelset turning machine of the aforementioned type is known from FR-PS No. 1,269,726.

In this underfloor wheelset turning machine the peripheral faces of the friction rollers are made identical and disposed at the same distance from the wheelset centre.

On such an underfloor wheelset turning machine the reprofiling of the wheel tire contours in the wheel tire regions where the fricton rollers are simultaneously pivoted to the extent of the cut depth in the direction towards the wheelset axle as possible only with small clamping force because each friction roller during its pivoting from the worn to turned wheel tire region can transmit only a small frictional force to the wheel tire.

This has an unfavourable effect on the time required for reprofiling the two wheel tire contours of a wheelset.

The problem underlying the innovation is to construct an underfloor wheelset turning machine of the type mentioned at the beginning in such a manner that the reprofiling of the two wheel tire contours of a wheelset is possible in shorter time.

According to the innovation this problem is solved in that the peripheral faces of two friction rollers are disposed further from the wheelset centre compared with the peripheral faces of the other two friction rollers.

Figure 2:
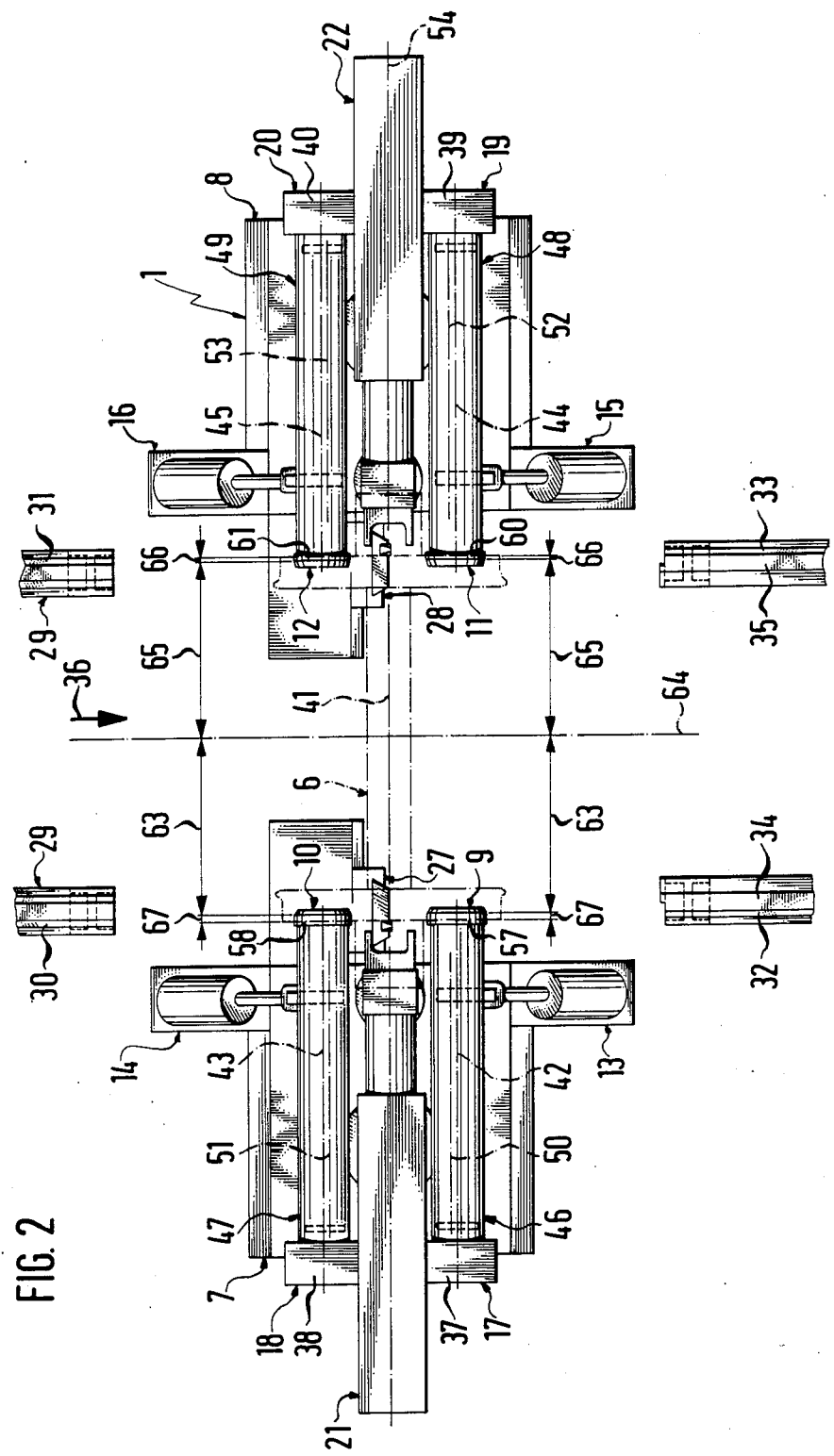
Figure 3:
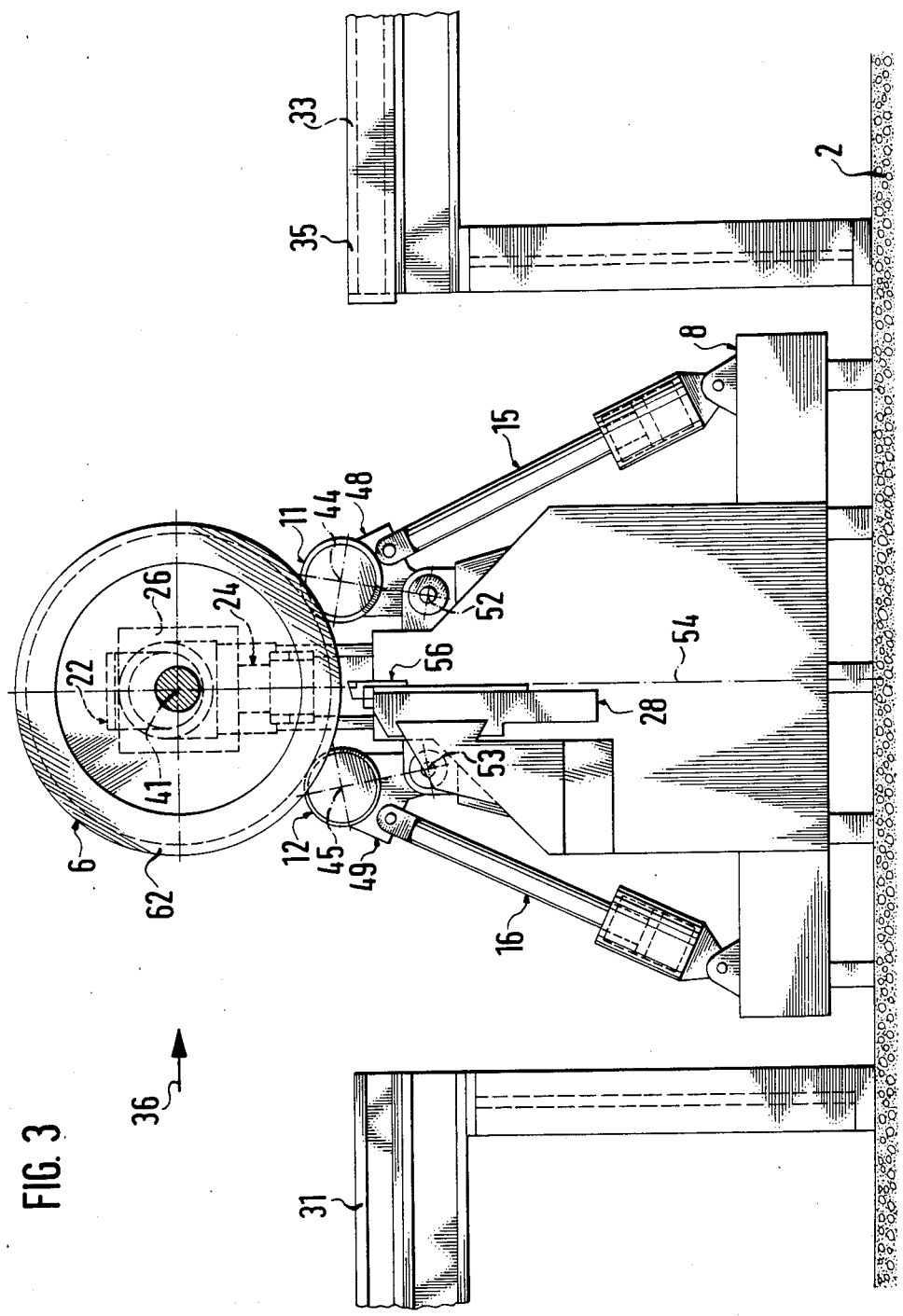
Figure 4:
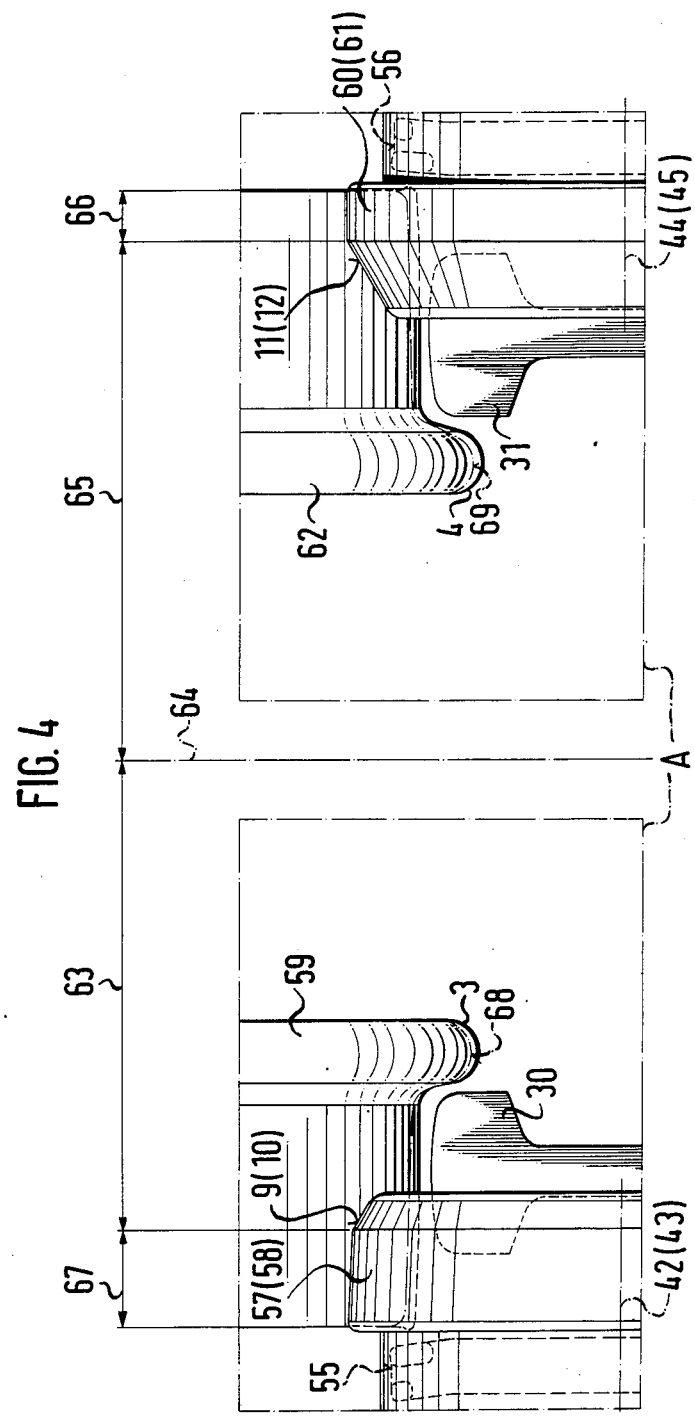
Figure 5:
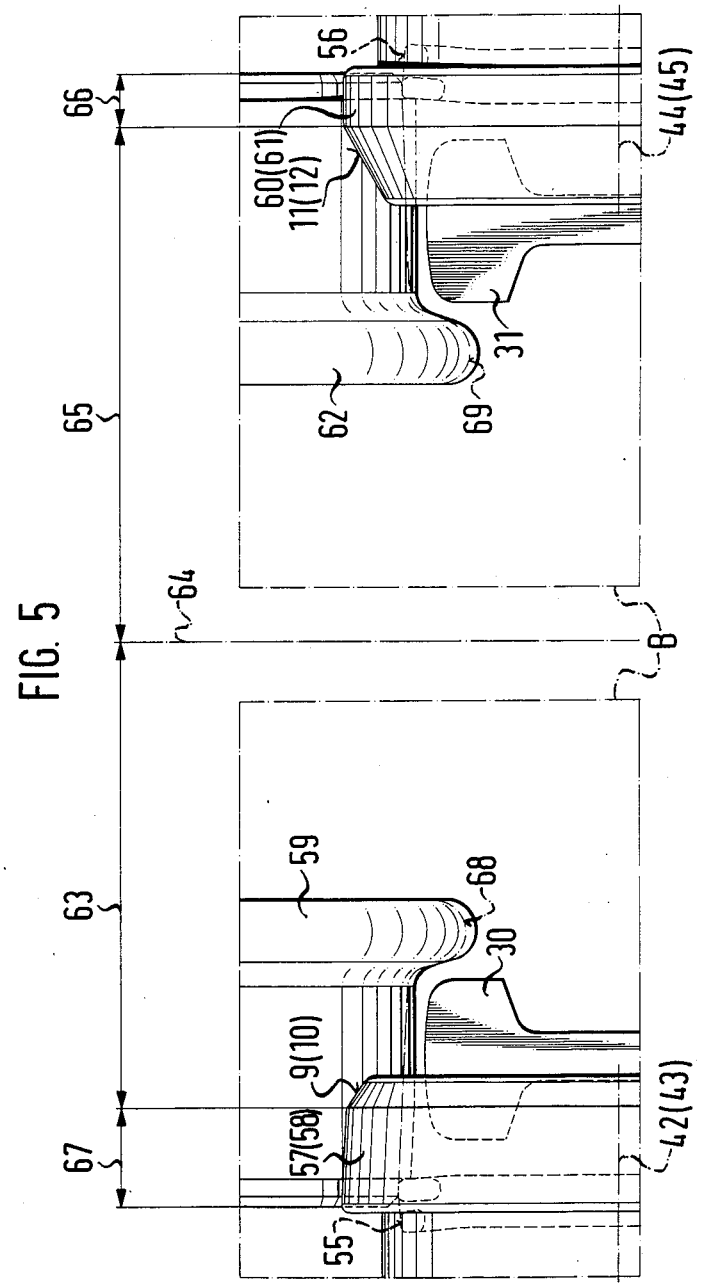
Figure 6:
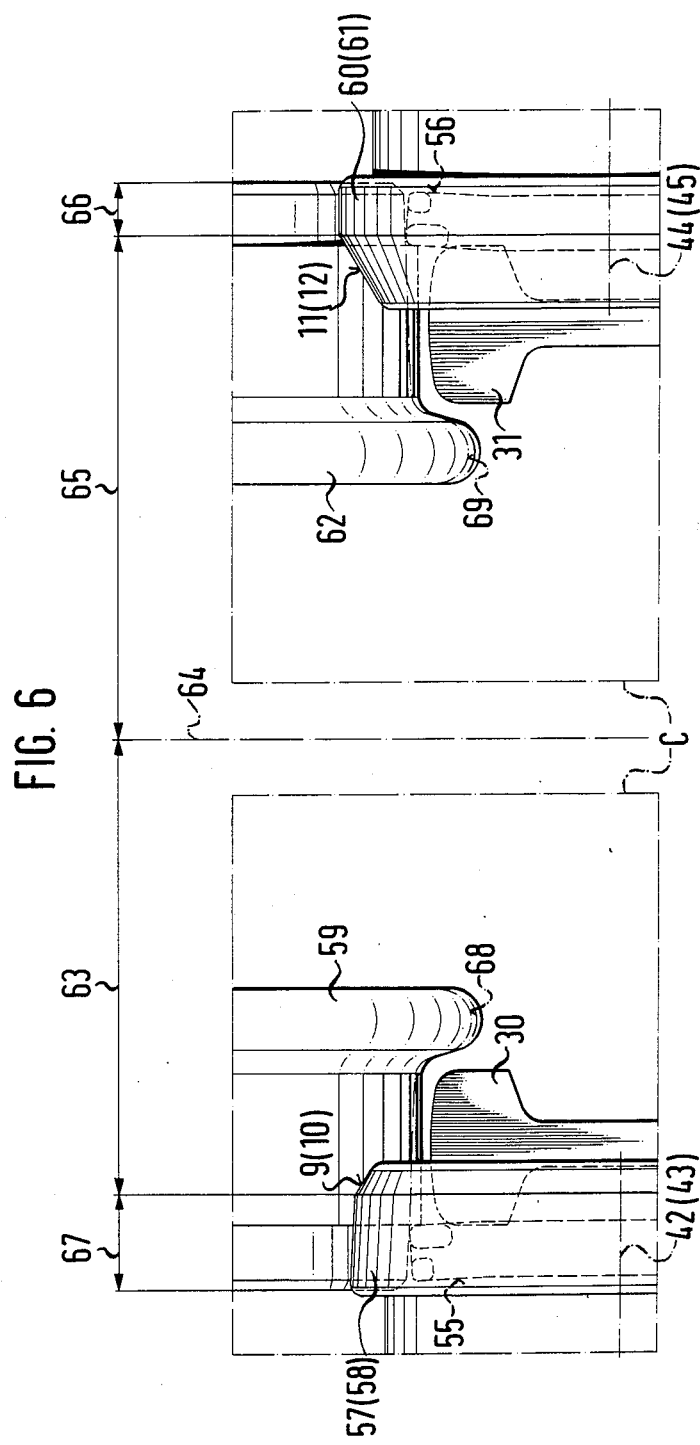
Figure 7:
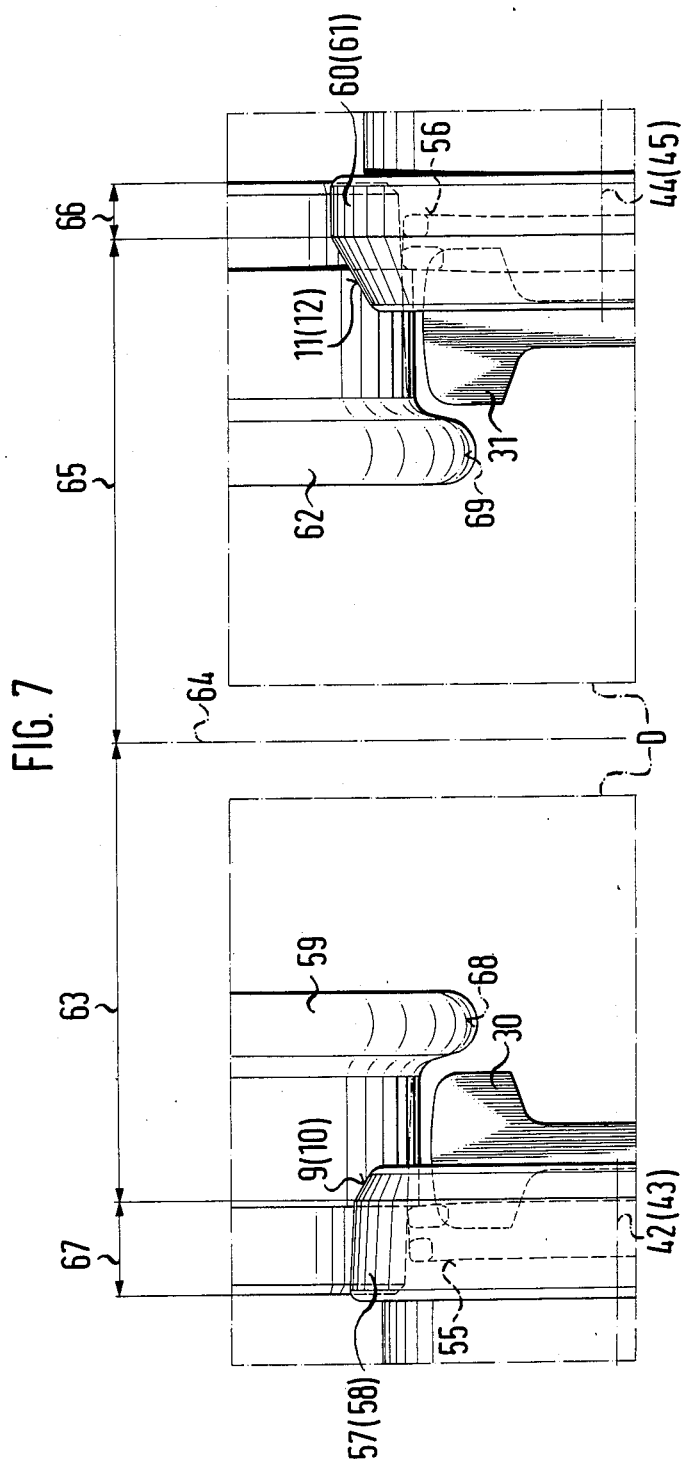
Figure 8:
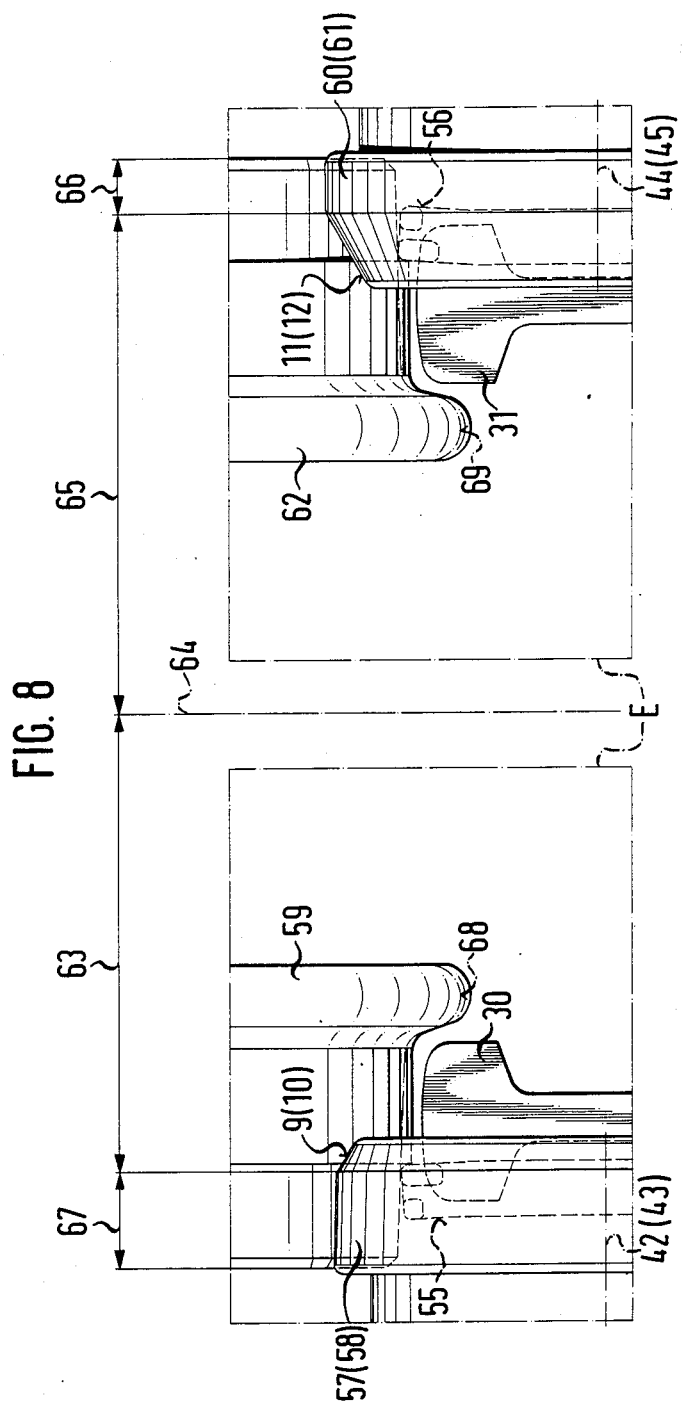

Hereinafter the innovation will be described in detail with reference to an example of embodiment illustrated schematically in the drawings, wherein:

FIG. 1 shows an underfloor wheelset turning machine and a wheelset received thereby in elevation with partial view of a vehicle body resting on the wheelset and a partial section through a foundation, FIG. 2 shows the underfloor wheelset turning machine in plan view with the wheelset shown in dot-dash line, FIG. 3 is a section corresponding to the line III—III of FIG. 1 to a larger scale, FIG. 4 shows two fragments A of FIG. 1 to a larger scale, FIGS. 5 to 9 show fragments B, C, D, E and F corresponding to FIG. 4 in five different reprofiling phases.

An underfloor wheelset turning machine or lathe 1 which is fixedly connected to a foundation 2 is used for reprofiling the wheel tire contours 3, 4 of a wheelset 6 installed in a track vehicle 5.

The underfloor wheelset turning machine 1 comprises two machine units 7, 8, each having two friction rollers 9, 10, 11, 12, two pivot drives (13, 14, 15, 16) and two rotary drives 17, 18, 19, 20 for the friction rollers 9, 10, 11, 12, a holding-down means (21, 22) and a support means 23, 24 for an axle box 25, 26 of the wheelset 6 and a turning support 27, 28.

The underfloor wheelset turning machine 1 comprises a track 29 having two entry rails (30, 31) and exit rails 32, 33 and two bridging rails 34, 35 for bridging the area between the entry rails (30, 31) and exit rails 32, 33.

The bridging rails 34, 35 are arranged displaceably in the track direction 36 so that they can be removed from the working region of the turning supports 27, 28.

The rotary movement of the friction rollers 9, 10, 11, 12 is generated by four hydromotors 37, 38, 39, 40.

Each friction roller 9, 10, 11, 12 has an axis of rotation 42, 43, 44, 45 extending parallel to the wheelset axle 41.

Each rotary drive 17, 18, 19, 20 is held by a rocker 46, 47, 48, 49.

The rockers 46, 47, 48, 49 are pivotal individually each about a pivot axis 50, 51, 52, 53 disposed parallel to the wheelset axle 41 and each connected articulately to a pivot drive 13, 14, 15, 16.

On introduction of the wheelset 6 into the underfloor wheelset turning machine 1, said wheelset is first rolled over the entry rails (30, 31) and the bridging rails 34, 35 in the track direction 36 up to the machine centre 54. Thereafter the wheelset 6 is raised somewhat above the track level by pivoting the friction rollers 9, 10, 11, 12 in the direction towards the wheelset axle 41.

In the raised position of the wheelset 6 the bridging rails 34, 35 are consecutively moved in the track direction 36 out of the working area of the turning supports 27, 28 and the two axle boxes 25, 26 of the wheelset 6 arrested by the hold-down means (21, 22) and the support means 23, 24 (FIGS. 1 and 3).

In the position of the wheelset 6 illustrated in FIGS. 1 and 3 the reprofiling of the wheel tire contours 3, 4 is effected by the turning supports 27, 28 each equipped with a turning tool 55, 56.

Of the four driven friction rollers 9, 10, 11, 12 two (9, 10) engage a peripheral face 57, 58 at the left wheel tire 59 and two (11, 12) engage a peripheral face 60, 61 at the right wheel tire 62.

Each peripheral face 57, 58, 60, 61 can be considered to be the generatrix of a truncated cone.

The peripheral faces 60, 61 of the friction rollers 11, 12 are about half as narrow as the peripheral faces 57, 58 of the friction rollers 9, 10.

The peripheral faces 57, 58 of the friction rollers 9, 10 are disposed at a distance 63 from the wheelset centre 64.

The peripheral faces 60, 61 of the friction rollers 11, 12 are spaced from the wheelset centre 64 a distance 65 which is greater than the distance 63 by an amount corresponding to the amount which the width 66 of a peripheral face 60, 61 is narrower compared with the width 67 of a peripheral face 57, 58.

By the different distances 63, 65 of the peripheral faces 57, 58, 60, 61 from the wheelset centre 64 it is ensured that of the four friction roller 9, 10, 11, 12 at least two can transmit their full frictional force to the wheelset 6 (FIGS. 5 to 9).

If the peripheral faces 57, 58, 60, 61 are disposed at four different distances from the wheelset centre 64, of the four friction rollers 9, 10, 11, 12 at least three can transmit their full frictional force to the wheelset 6.

During the reprofiling operation the two turning tools 55, 56 each cut a new wheel tire profile 68, 69 (FIGS. 4 to 9).

After the reprofiling of the wheel tire contours 3, 4 in succession the turning supports 27, 28 are retracted from their working area, the bridging rails 34, 35 are moved into the region between the entry rails (30, 31) and the exit rails 32, 33 and the wheelset 6 is lowered onto the bridging rails 34, 35 by pivoting the friction rollers 9, 10, 11, 12.

Thereafter the wheelset 6 is rolled over the bridging rails (34, 35) and the exit rails 32, 33 out of the underfloor wheelset turning machine 1. After this, the underfloor wheelset turning machine 1 is ready for reprofiling the wheel tire contours of another wheelset.

We claim:

1. An underfloor wheelset turning machine for reprofiling the wheel tire contours of railway wheelsets comprising a rail track, two machine units each carrying a turning support and a pair of driven friction rollers, the friction rollers being pivotable individually on the respective machine unit about a horizontal pivot axis normal with respect to the rail track, each friction roller having a peripheral surface adapted to engage a wheelset, power means for pressing the peripheral surface onto a tire wheel, the peripheral surfaces of the pair of friction rollers of one machine unit being disposed at a greater distance from the machine centerline extending in the longitudinal direction of the rail track than the peripheral surfaces of the pair of friction rollers of the other machine unit.

* * * * *